US007577835B2

(12) United States Patent
Anspach et al.

(10) Patent No.: US 7,577,835 B2
(45) Date of Patent: *Aug. 18, 2009

(54) DEPLOYABLE SECURE COMMUNICATION SYSTEM

(75) Inventors: Steve Anspach, Tampa, FL (US); Jose Lleras, Tampa, FL (US); Luke Salazar, St. Petersburg, FL (US); Greg Kasson, Clearwater, FL (US)

(73) Assignee: TeleCommunication Systems, Inc., Annapolis, MD (US)

( * ) Notice: Subject to any disclaimer, the term of this patent is extended or adjusted under 35 U.S.C. 154(b) by 713 days.

This patent is subject to a terminal disclaimer.

(21) Appl. No.: 10/643,868

(22) Filed: Aug. 20, 2003

(65) Prior Publication Data

US 2005/0044358 A1 Feb. 24, 2005

(51) Int. Cl.
*H04L 29/06* (2006.01)
(52) U.S. Cl. ..................................... 713/160
(58) Field of Classification Search ............... 726/13; 713/160
See application file for complete search history.

(56) References Cited

U.S. PATENT DOCUMENTS

| | | | |
|---|---|---|---|
| 4,853,830 A | 8/1989 | Corfits et al. | |
| 5,305,377 A | 4/1994 | D'Arcy | |
| 5,562,695 A | 10/1996 | Obenchain | |
| 5,652,695 A | 7/1997 | Schmitt | |
| 5,982,888 A | 11/1999 | Luckeneder et al. | |
| 6,118,768 A | 9/2000 | Bhatia et al. | |
| 6,144,667 A | 11/2000 | Doshi et al. | |
| 6,275,573 B1 | 8/2001 | Naor et al. | |
| 6,282,204 B1 | 8/2001 | Balatoni et al. | |
| 6,496,867 B1 * | 12/2002 | Beser et al. | 709/245 |
| 6,640,248 B1 | 10/2003 | Jorgensen | |
| 6,661,677 B1 | 12/2003 | Rumney et al. | |
| 6,700,694 B2 | 3/2004 | Zou et al. | |
| 6,700,964 B2 | 3/2004 | Schmid et al. | |
| 6,954,520 B1 | 10/2005 | Lang et al. | |
| 7,023,818 B1 * | 4/2006 | Elliott | 370/328 |
| 7,023,996 B2 * | 4/2006 | Stephenson et al. | 380/270 |
| 2001/0003846 A1 | 6/2001 | Rowe et al. | |
| 2002/0004898 A1 | 1/2002 | Droge | |
| 2002/0031126 A1 | 3/2002 | Crichton et al. | |
| 2002/0059516 A1 | 5/2002 | Turtiainen et al. | |
| 2002/0141389 A1 | 10/2002 | Fangman | |
| 2003/0121047 A1 | 6/2003 | Watson et al. | |
| 2003/0128696 A1 | 7/2003 | Wengrovitz et al. | |
| 2004/0153643 A1 | 8/2004 | Correll et al. | |

OTHER PUBLICATIONS

Di Francisco, Michael; Stephenson, Joy; Ellis, Christopher. Global Broadcast Service (GBS) End-to-End Services: Protocols and Encapulation. Booz Allen & Hamilton. MClean, Virginia. 2000. IEEE. pp. 704-709.*

(Continued)

*Primary Examiner*—Kambiz Zand
*Assistant Examiner*—Jason K Gee
(74) *Attorney, Agent, or Firm*—William H. Bollman

(57) ABSTRACT

A secure Voice-Over-IP (VOIP), video and data network functionality in a single, small size deployable case, for a remote user. While capable of secure communications, the disclosed system also provides communication capability (VOIP, video and/or data) in a non-secure manner if desired. Most importantly, bulk encrypted (i.e., secure) data may be routed over a public network, e.g., the Internet.

6 Claims, 9 Drawing Sheets

OTHER PUBLICATIONS

KIV-7 Family. http://fas.org/irp/program/security/_work/kiv-7.html. Accessed on Jul. 2, 2007. pp. 1-3. Jul. 8, 2001.*

KIV-21 ViaSat IP Crypto. ViaSat. http://www.viasat.com/_files/_08fe203b613bc02b87de181a370e2bdf/pdf/KIV_21_01.pdf. Accessed on Jul. 2, 2007. pp. 1-2. Oct. 5, 2001.*

Haight, Charles F. EP 1283630A2. Jan. 8, 2002.*

Consolidated Voice and Data Services for Secure Mobile Networking, ViaSat.

Kiv-21 News, Rapid Deploy Mobile Terminals, Summer 2002, pp. 1-4.

DTECh Labs, Inc., Dwyer, James, Protest Under 37 CFR 1.291, Jun. 2007, pp. 1-19.

KLAS Ltd, The Complete PC Solution for the KIV-7, pp. 1-4.

Mykotronx, KIV-7 Embeddable KG-84 COMSEC Module, Jul. 1998, pp. 1-2.

Granite Island Group, Secure Telephone Units, Crypto Key Generators, Encryption Equipment, and Scramblers, Technical Surveillance Counter Measures, 2002, pp. 1-58.

Shake, Thomas H., Distributed Systems Group, Lincoln Lab., Massachusetts Institute of Technology, Security in Military/Commercial Communication Gateways, pp. 469-474.

DiFrancisco, Michael, et al., Booz-Allen & Hamilton, Global Broadcasts Service (GBS) End-to-End Services: Protocols and Encapsulation, pp. 704-709.

Diversified Technology LLC, Sectera BDI Terminal Satcase Datasheet Marketing Literature, Published Nov. 2003. Document displays Secure Communications Terminal featuring removable faceplate for encryption device.

Diversified Technology, LLC, Schematic BDI100A2003A Removable Faceplate, published Nov. 17, 2003, document describes Bracket to Hold SCIP/FNBOT Encryption Device as part of a Secure Communcations Terminal.

Diversified Technology,y LLC, Schematic BDI100A2005A Sectera Bracket, Published Nov. 17, 2005, document describes Bracket to Hold SCIP/FNBOT Encryption Device Beneath Removable Faceplace as part of a Secure Communications Terminal.

Diversified Technology, LLC, Schematic BDM100A2001A Chassis, Published Nov. 17, 2003. Document describes Chassis to Hold SCIP/FNBT Encryption Device as part of a Secure Communications Terminal.

Diversified Technologies, LLC, Scematic BDI100A2002A Cover Plate, Published Nov. 17, 2003, document describes Cover Plate to Hold Removable SCIP/FNBDT Faceplate as part of a Secure Communications Terminal.

Diversified Technologies, LLC, 3D Card Drawing, Published Nov. 17, 2003, document shows Removable Cover Plate Assembly as part of Secure Communications Terminal.

Diversified Technology, LLC, Photograph, Published Nov. 17, 2003, document shows SCIP/FNBDT Encryption Device in Cradle with Removable Faceplate Removed as part of a Secure Communications Terminal.

Diversified Technology, LLC, Sales Order, Published Dec. 19, 2003, document shows Commercial Sale of Secure Communications Terminal Featuring Removable Faceplate for SCIP/FNBDT Encryption Device.

Diversified Technology, LLC, Shipping/Invoice 2004-001, Published Dec. 24, 2003, document shows Shipment and Invoice for Commercial Sale of Secure Communications Terminal Featuring Removable Faceplate for SCIP/FNBDT Encryption Device.

Diversified Technology, LLC, Shipping/Invoice 2004-013, Published Jan. 23, 2004, document shows Shipment and Invoice for Commercial Sale of Secure Communications Terminal Featuring Removable Faceplate for SCIP/FNBDT Encryption Device.

Diversified Technology, LLC, Press Release Only Secure IP Gateway, Published Aug. 1, 2004, document announces enhanced version of Secure Communications Terminal featuring Removable Faceplate for SCIP/FNBDT Encryption Device.

Diversified Technology, LLC, ONYX Datasheet, Published Aug. 1, 2004, document describes enhanced version of Secure Communications Terminal featuring Removable Faceplate for SCIP/FNBDT Encryption Device.

Diversified Technologies, LLC, BDI-100A Operations Manual Published Oct. 20, 2003, pp. 1 and 2 shown, Operations Manual for Secure Communications Terminal featuring Removable Faceplate for SCIP/FNBDT Encryption Device.

Nortel Network, Securing Voice accorss the Internet retrieved date May 5, 2008 http://www.nortel.com/products/01/contivity/collateral/nn101720-0902.pdf 2002.

Lin, Tzung-Pao; "Switch Access Architecture for Quad Voice Lines with Data On-Demand per ISDN BRI;" Apr. 1989; IEEE; INFOCOM '89, pp. 647-654.

http://www.ietf.org/rfc/rfc2406.txt, reterived date Nov. 20, 2008.

Mykrotronix, "KIV-7 Embeddable KG-84 COMSEC Module," Jul. 1, 1998, pp. 1-2.

Cisco Systems, CISCO 1751 Modular Access Router, 1992-2003, pp. 1-19.

L-3 Communications' OMNI Secure Terminal Receives National Security Agency—NSA—Certification, published Jun. 12, 2002 in Business Wire.

* cited by examiner

NETWORK SERVER MODULE

DEPLOYABLE SECURE COMMUNICATION SYSTEM

BACKGROUND OF THE INVENTION

1. Field of the Invention

This invention relates generally to computer and communication networks, and more specifically, to a deployable communication system used to provide secure voice, video and data services to multiple remote users.

2. Background of Related Art

Conventional deployable communication systems exist:

Turtle Mountain—TMC PCS-M4—http://www.turtle-mt-n.com/pcsm4.pdf

General Dynamics—ReadySET—http://www.qd-decisionsystems.com/readVset/

Raytheon T—VSAT—http://www.raytheon.com/c3i/c3iproducts/c3i076/c3i076.htm

AOS Inc—GCS Netlink GAN—http://www.aosusa.com/netlink_m4.html

NERA WorldCommunicator—http://www.aosusa.com/neraworldcom.htm

Global Communication Solutions Inc.—GCS 400 Series—http://www.globalcoms.com/Pages/custom_systems/qcs400_series.htm Mobile Telesystems Inc—MTI-M4-128—http://mti-usa.com/

LOGIX—Portable Satellite Communication Suitcase—http://www.logixusa.com/Products.html#immar FIG. 9 is a depiction of a particular conventional deployable secure communication system.

In particular, as shown in FIG. 9, a secure encryption module such as defined by KIV-7 standards 912 with suitable interface hardware is utilized in a direct connection path between a remote user 910 and a wireless connection to a similarly secure receiver via a satellite antenna 914. In the conventional system of FIG. 9, an ISDN link is utilized between the module 912 including a KIV-7 encryption module, and a suitable satellite two-way communication transceiver and antenna 914.

However, such conventional systems are typically physically large but more importantly allow for only direct connection communication between a remote user and a receiver to maintain security in the communications. While this is quite useful in many situations, only limited communications are possible in a direct connection. For instance, direct connectivity does not allow access to wired public communication systems, e.g., the Internet.

There is a need for a small, lightweight, easily portable and easily deployable communication system that permits broader functionality than that available using a direct connection, including direct access to a public network system.

BRIEF DESCRIPTION OF THE DRAWINGS

Features and advantages of the present invention will become apparent to those skilled in the art from the following description with reference to the drawings, in which.

SUMMARY OF THE INVENTION

Figure 1:
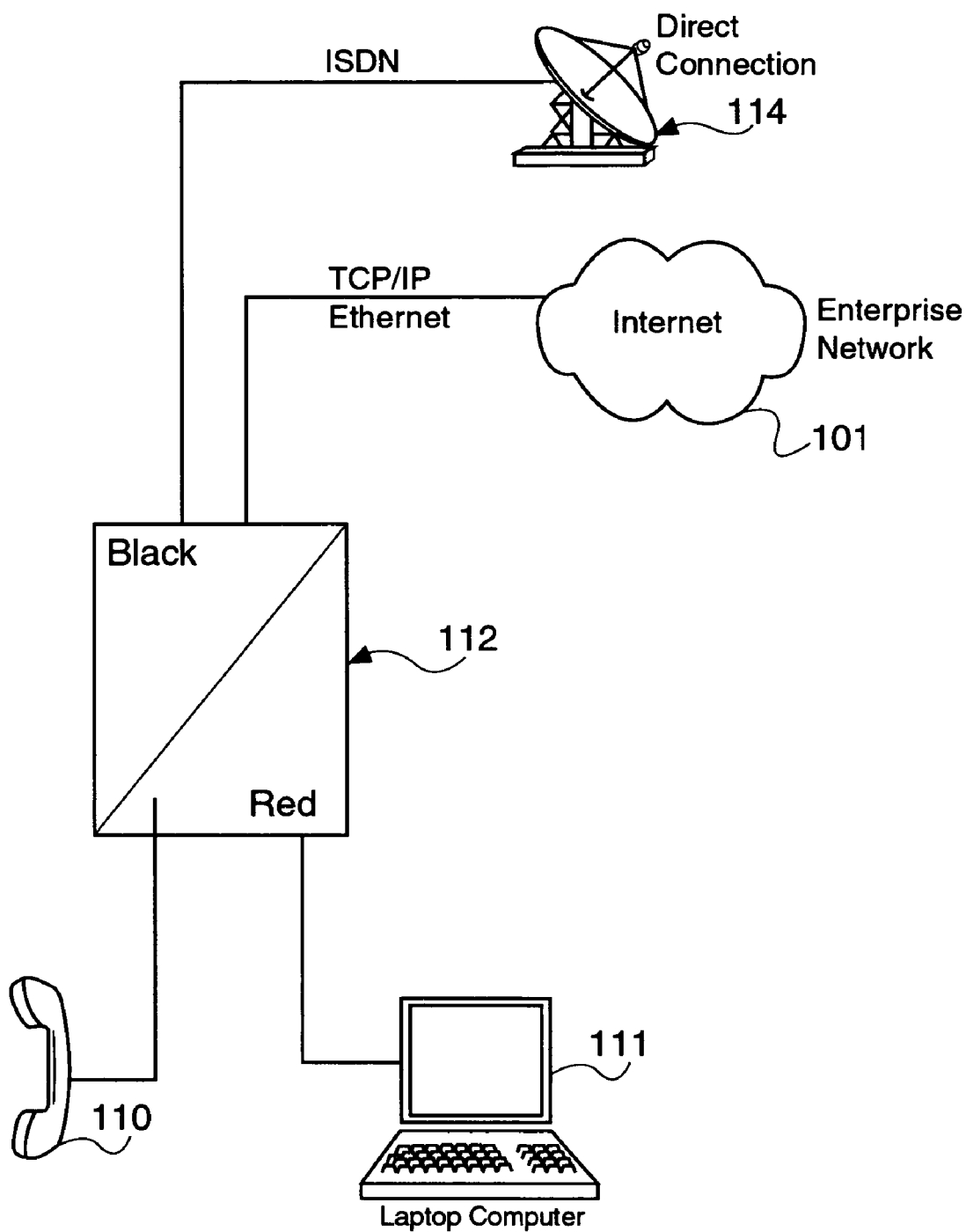
FIG. 1 is a block diagram of an exemplary deployable secure communication system, in accordance with a first embodiment of the present invention.

In accordance with the principles of the present invention, a method for providing network functionality and voice-over-IP services to a remote user at a deployed location comprises providing an encryption module having a secure side and a non-secure side. The non-secure side of the encryption module is accessed with bulk network data. The bulk network data is passed through the encryption module to produce encrypted bulk network data. The encrypted bulk network data is encapsulated in IP packets. The encapsulated encrypted bulk network data is routed through an Internet.

In accordance with another aspect of the invention, a method of providing a deployable communication system comprises passing network data through a KIV type encryption device to provide bulk encrypted data. The bulk encrypted data is encapsulated in IP packets. The IP encapsulated, bulk encrypted data is routed over an Internet. The deployable communication system enables routing of secure communications via the Internet.

DETAILED DESCRIPTION OF ILLUSTRATIVE EMBODIMENTS

The present invention provides secure Voice-Over-IP (VOIP), video and data network functionality in a single, small size deployable case, to a remote user. While capable of secure communications, the disclosed system also provides communication capability (VOIP, video and/or data) in a non-secure manner if desired. Most importantly, the present invention allows for the routing of bulk encrypted (i.e., secure) data over a public network, e.g., the Internet. The disclosed deployable system provides these capabilities without the need to remove and assemble components.

The disclosed deployable secure communications system can be deployed even at the most remote regions of the world where no other communication means are available, taking advantage of the satellite direct connection link, or (very importantly) in more developed regions that might include access to the Internet (e.g., in a hotel room, high speedx).

The disclosed deployable secure communications system can be deployed to provide a multitude of applications for remote users. Uses include emergency response, news reporting, public safety, drilling and mining operations, field surveys and other activities that require remote capabilities for video and data transmissions.

The system, once deployed and operational, offers access to the Internet or corporate network using a direct link via an Inmarsat M4 GAN network or ISDN terrestrial circuit. For those systems configured with a KIV-7 encryption device, access to the SIPRNET and other secure voice and data networks is possible. However, importantly, the disclosed deployable secure communication system also provides an access point for a direct link to a local enterprise network providing IP encapsulated information for transmission over a network such as the Internet. In this way, bulk encrypted data may be routed using an available link (e.g., a wired Ethernet port in a hotel room, high speed cable, etc.) Thus, secure data communications and/or voice-over-IP communications over the Internet are possible.

The disclosed deployable communication system provides a single user, or multiple users, remote secure access to a local enterprise network, and thus access to services conventionally provided only to direct connected users. Also, up to two simultaneous voice over IP calls may be established along with normal data connectivity via, e.g., a laptop computer.

FIG. 1 is a block diagram of an exemplary deployable secure communication system, in accordance with a first embodiment of the present invention.

In particular, FIG. 1 shows a deployable communications module 112 including a secure encryption module, e.g., one built according to KIV-7 requirements. On the red, non-secure side of the deployable communications module 112, voice communications 110 and/or data communications such as from a laptop computer 111 or other digital device are provided with suitable interfaces.

For instance, the analog telephone 110 may interface with a standard 2-wire telephone loop. Alternatively, the telephone may be a digital telephone and be provided with an ISDN type digital subscriber link to the deployable communications module 112. The laptop computer may communicate with the deployable communications module 112 using a standard Ethernet 10baseT or 100baseT type network link.

On the black, or secure side, the disclosed deployable system includes an Inmarsat M4 terminal 114 providing a direct connection to an enterprise network via a satellite. The M4 Satellite terminal is, e.g., a Nera WorldCommunicator portable Inmarsat M4 satellite terminal, which is a portable Inmarsat M4 satellite terminal capable of providing 64 kbps ISDN connectivity to remote users. Additional features include a 3-panel antenna with RF transceiver; a wireless DECT 2.4 Ghz Handset; and a modem unit and battery pack.

Importantly, the present invention also provides an Ethernet direct connection to a local enterprise network, e.g., a hotel Ethernet network having direct access to the Internet, high speed cable, etc. Thus, when the deployable communication system is in the convenience of modern accommodations, such as in a hotel or other public place that provides an Ethernet link to the Internet, such services may be utilized without the need to set up the direct connection using the Inmarsat M4 terminal 114.

It is important to understand that this direct connection to the Internet is on the black side of the deployable communication system, thus bulk encrypted data (i.e., secure data) may be conveniently routed along the public Internet 101 to a desired destination. This saves bandwidth on the relevant satellite, and also battery power necessary to drive the satellite transceiver. It also simply provides secure communications while in a hotel room or similar public place, near a cable modem, etc.

Figure 2:
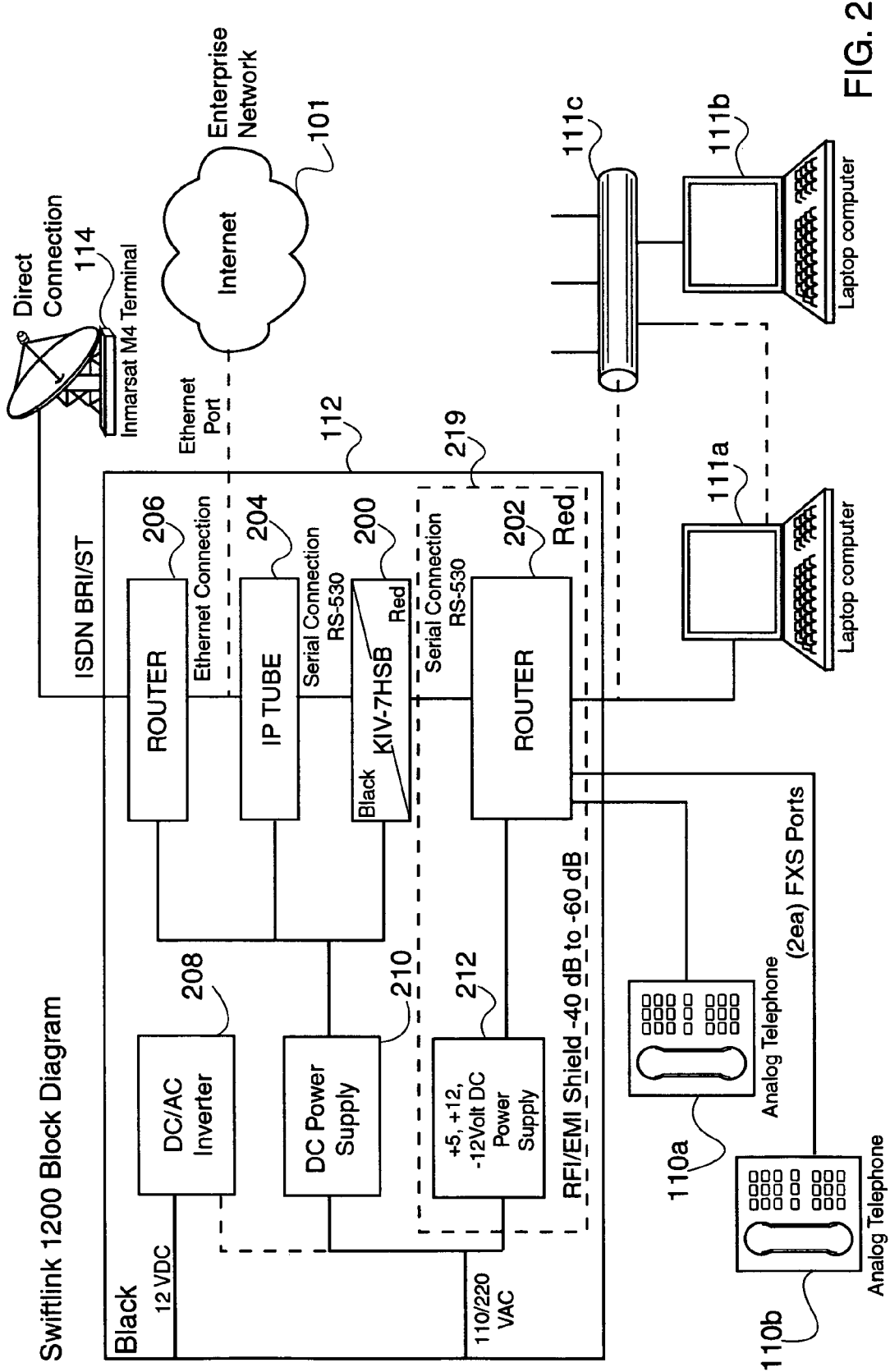
FIG. 2 is a more detailed block diagram of the exemplary deployable secure communication system shown in FIG. 1.

FIG. 2 is a more detailed block diagram of the exemplary deployable secure communication system shown in FIG. 1.

In particular, as shown in FIG. 2, the deployable communications module 112 includes a black (encrypted, or secure) portion and a red (non-encrypted, or unsecure) portion.

The red portion includes a router 202, e.g., a Cisco 1751-V voice enabled modular access router. This router 202 includes one fast Ethernet (10/100OBaseTX) port; Interface cards support either WIC or VIC modules; and it supports VoIP, VoFR, and VoATM connections.

The red portion also includes a suitable power supply such as the +5V, +12V and −12V power supply 212 shown in FIG. 2. The red components are shielded in a suitable RFI/EMI shielding preferably providing −40 dB to −60 dB of isolation. The compartment in which the red components sit may also be coated with a suitable RFI/EMI isolating coating.

The black portion includes a KIV-7 device 200 such as the KIV-7HSB shown in FIG. 2. The disclosed KIV-7HSB is a Mykotronx KIV-7 module is a standard compact, economical, high performance, and user-friendly COMSEC device, designed to meet users' needs for secure data communication links. Features of this unit include Commercial Off-the-shelf (COTS) Type I data encryption; KG-84/-84A/-84C interoperability; User-friendly menu-based operator interface; and Standard D-type rear-panel interface connectors.

An IP tube 204 such as that commercially available from Engage Communications encapsulates encrypted data, and passes it either to an Ethernet port which may be wired directly to an Ethernet network having access to the Internet 101, or to a black-side router 206 (e.g., commercially available from CISCO). The router 206 includes an ISDN port (ISDN/BRI/ST) to link to the Inmarsat M4 terminal 114.

The KIV-7 preferably uses a serial RS-530 connection both on its red side to the red side router 202, as well as on the black side to connect to the IP tube 204. The red side router 202 is suitably configured for operation with the KIV-7 encryption device 200.

The red side router 202 is configured to allow for transparent, automated operation for the user. All off-network traffic is routed via the serial port to the KIV-7HSB for bulk encryption. In addition, the voice ports are configured so that dialing a "9" (or any other string desired by the user) will result in off-network traffic and be routed to the distant end gateway.

The IP tube 204 has firmware modified from that otherwise commercially available to allow acceptance of encrypted data. The firmware was modified so that the IP Tube clock could be tuned to match the output of the KIV-7HSB. In addition, the firmware was also modified to allow for a dial-on-demand feature so the unit would be in an idle state until interesting traffic were presented.

The laptop computer 11a depicts in solid line a one-to-one connection into the red side router 202. In a dotted line depiction, multiple computing devices 111a-111b may be networked over a conventional Ethernet network 111c, with the red side router 202 being a member of that Ethernet network 111c.

Any computing device capable of an Ethernet connection may be implemented. In the disclosed embodiment, the laptop computers that were implemented were Panasonic Toughbooks™. Those laptop computers are ruggedized in that it is shock, dust, vibration and water resistant, making it a good choice for a deployable communication system. Additional features include design to MIL-STD-810F test procedures; and password security (Supervisor, User), "Access Key".

The deployable communication system communicates over the Internet (considered black with respect to the bulk encrypted data passed through the Ethernet port of the IP tube 204) with a suitable IP gateway (not shown). As long as both sides know the IP address of the other, and the IP tube 204 is properly configured, communications will be enabled.

The IP Tube is configured so as to seek a specific distant end device and establish a dedicated tunnel. The internal side of the IP Tube is configured to seek a specific (distant end) IP address. The distant end device is configured to seek the opposite. Once located the two devices communicate and establish the tunnel.

Both the red side router 202 and the black side router 206 are configured to maintain QOS. The link fragmentation and packet interleaving are preferably implemented to assure voice quality. PPP multilinking may be utilized to maximize performance.

The routing information is not passed through the KIV-7HSB 200. The black side router 206 provides the routing of the WAN link. The red side router 202 provides the routing information for the network traffic and is contained in the encrypted payload. This information is passed from red side router 202 to black side router 206.

The disclosed deployable communication system provides up to two simultaneous voice-over-IP calls along with normal data connectivity. Connectivity between the remote system and the enterprise network is provided by the Inmarsat M4 terminal, through connection to a terrestrial ISDN circuit, or by connection to a network or the Internet. Transmissions between the deployed system and enterprise network are encrypted and fully secure up through the Top Secret level through the use of a KIV-7 bulk encryption device.

Importantly, the deployable communication system allows for routing of bulk encrypted data, a feature not available in any other deployable communication system employing a KIV-7 encryption device.

In the disclosed embodiment, commercial off the shelf (COTS) equipment is integrated at the board level into an outer case made of high quality plastics. The COTS (i.e., commercially available) equipment includes the Cisco 1751V router 202, the Cisco 801 router 206, the Engage Communications RS-530 IP Tube 204, the KIV-7HSB encryption unit 200, the tri-volt power supply 212, the DC power supply 210, and a DC/AC inverter 208.

Individual components are preferably integrated in such a manner so as to provide separation between encrypted and non-encrypted data, and to ensure protection of the components. Additionally, the specific integration and configuration of the system allows for operation by simply deploying the M4 terminal and applying power. Ideally, the deployable communication system 112 can be powered by universal AC input or by 12 VDC from a vehicle cigarette lighter.

Data entering the deployable communication system 112 and destined for the enterprise network is routed by the red side router 202 and passed to the encryption unit 200 for encryption. Once encrypted, the data is then passed to the RS-530 IP tube 204, where it is encapsulated into IP packets and passed to the black side Cisco 801 Ethernet to ISDN router 206.

This data is then passed out of the ISDN port of the black side router 206, and on to the direct connection to the Inmarsat M4 Terminal 114, where it is transmitted to the enterprise network.

The deployable communication system 112 accomplishes two specific functions during transmission.

Firstly, an IPSEC tunnel is established between the black side router 206 and a gateway router at the receiving fixed enterprise. This provides privacy for the overall link. Moreover, and importantly, it presents a commercial/civilian appearance to the transmitted encrypted signal.

Secondly, another tunnel is established between the deployed RS-530 tube 204 and another IP tube at the fixed enterprise network. With this second tunnel established, the bulk encrypted data from the KIV-7 type encryption unit 200, which is normally non-routable, is encapsulated in IP packets and routed to the distant end network.

Data encrypted by the KIV-7HSB encryption module 200 normally requires a dedicated, point-to-point circuit for communications to be successful. This is significant for two reasons.

First, through the use of the disclosed deployable communication system bulk encrypted data can be routed, thus making use of generic IP or network connections. Moreover, while the deployable communication system would normally be operated with a direct, one to one connection via the Inmarsat M4 Terminal 114, the process of encapsulating the bulk encrypted data into IP packets, and thus routing of the bulk encrypted data, allows for connecting the system into any network—or directly into the Internet via the Ethernet port made available at the output of the IP tube 204.

Second, the unique signature of the government used Type 1 encryption is masked by the two separate tunnels and appears as normal commercially encrypted data, thus providing a level of cover to individual operators.

The deployable communications system preferably includes grounding incorporated into grounded AC Power, and is contained in a single deployable case. The disclosed deployable communication system measured about 17"×12"×5" and weighed about 40 pounds, though other small measurements and light weight systems are within the scope of the present invention.

Preferably, expansion capabilities may be implemented to support additional users. Moreover, multiple connectivity may be provided by including flexible connection methods and speeds for voice, video and data services, including: a VSAT terminal, an ISDN terminal, an Inmarsat terminal, a conventional dial-up modem, and operate in either a secure or non-secure communications mode.

A single case deployable communications system in accordance with the principles of the present invention has particular application with the US military, federal, local and state agencies, disaster recovery agencies, public safety associations, news channels, and commercial enterprises, to name a few.

The disclosed deployable communication system preferably allows for operation "out of the box", meaning the only component requiring removal is the M4 terminal. Moreover, the deployable communication system is preferably of a size and weight so as to be capable of transport on commercial aircraft as checked baggage.

FIGS. 3 to 8 depict another embodiment of a deployable secure communication system in accordance with another aspect of the present invention.

Figure 3:
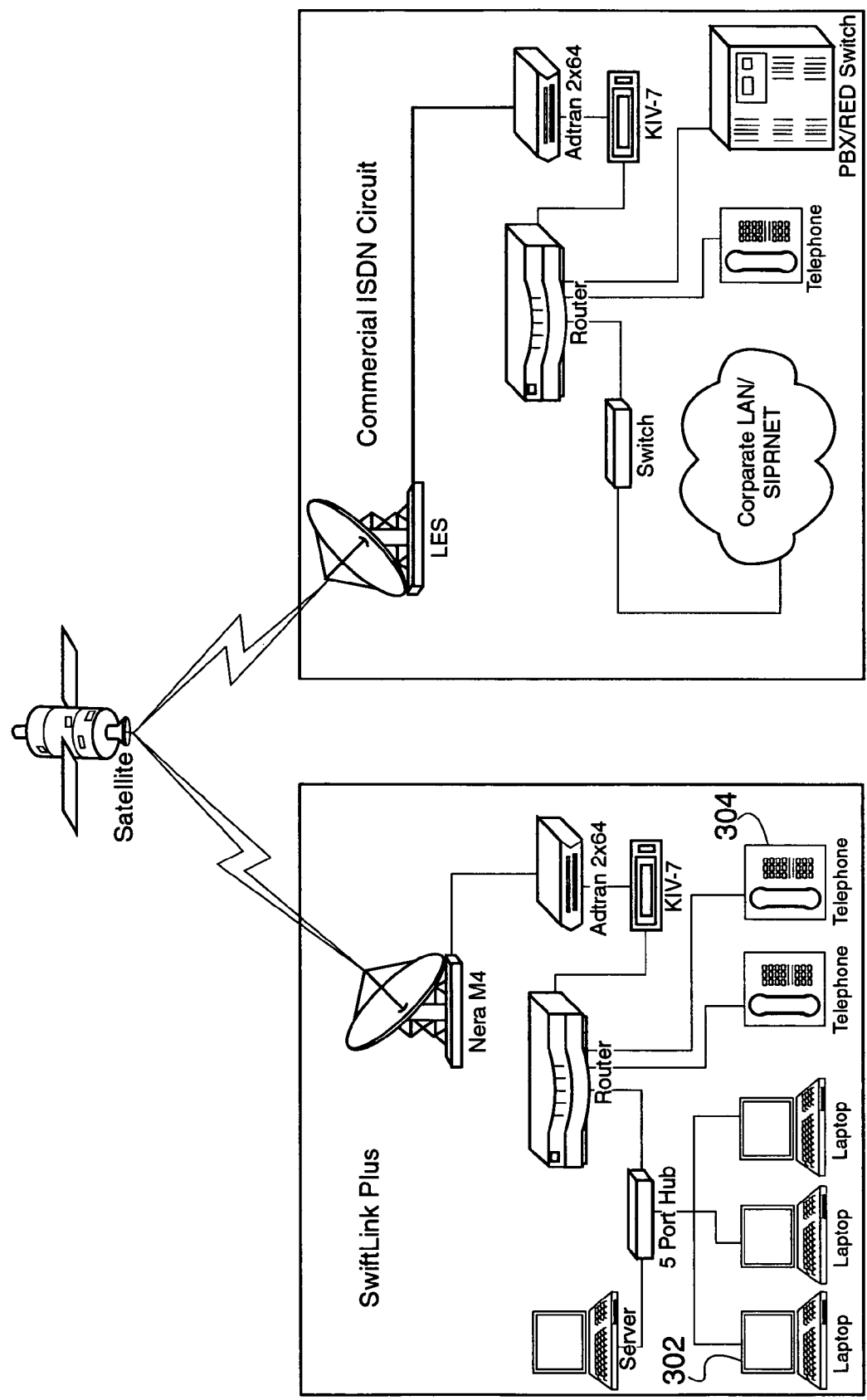
FIG. 3 shows a graphic depiction of another exemplary deployable communication system in communication with a gateway network, in accordance with another aspect of the present invention.

In particular, FIG. 3 shows a graphic depiction of another exemplary deployable communication system in communication with a gateway network, in accordance with another aspect of the present invention.

As shown in FIG. 3, laptops 302 and telephones 304 are shown being routed by a router, encrypted by a KIV-7 device, and routed to an Inmarsat M4 terminal that communicates through a satellite.

Figure 4:
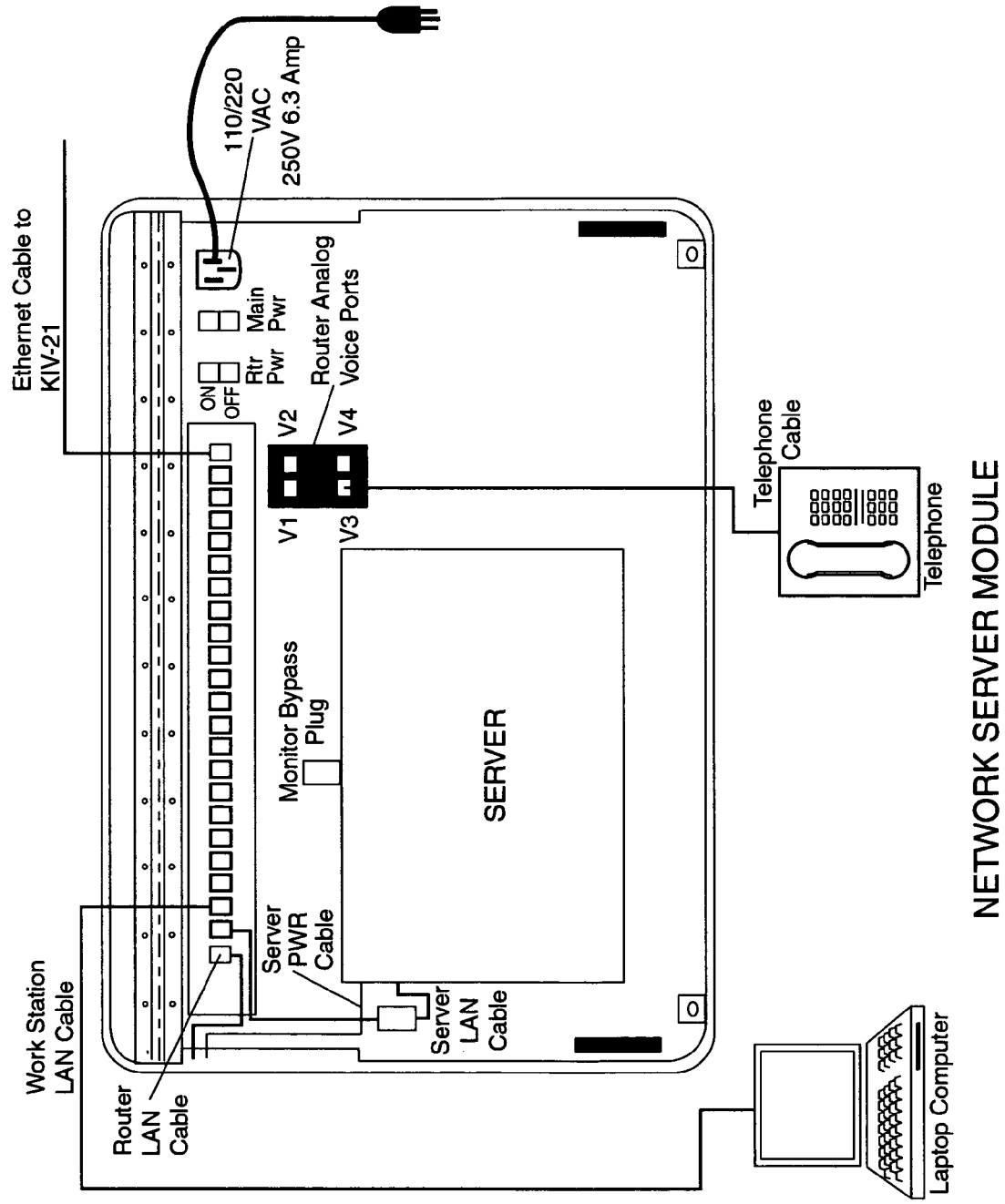
FIG. 4 shows an exemplary network server module, in accordance with the principles of the present invention.

FIG. 4 shows an exemplary network server module, in accordance with the principles of the present invention.

Figure 5:
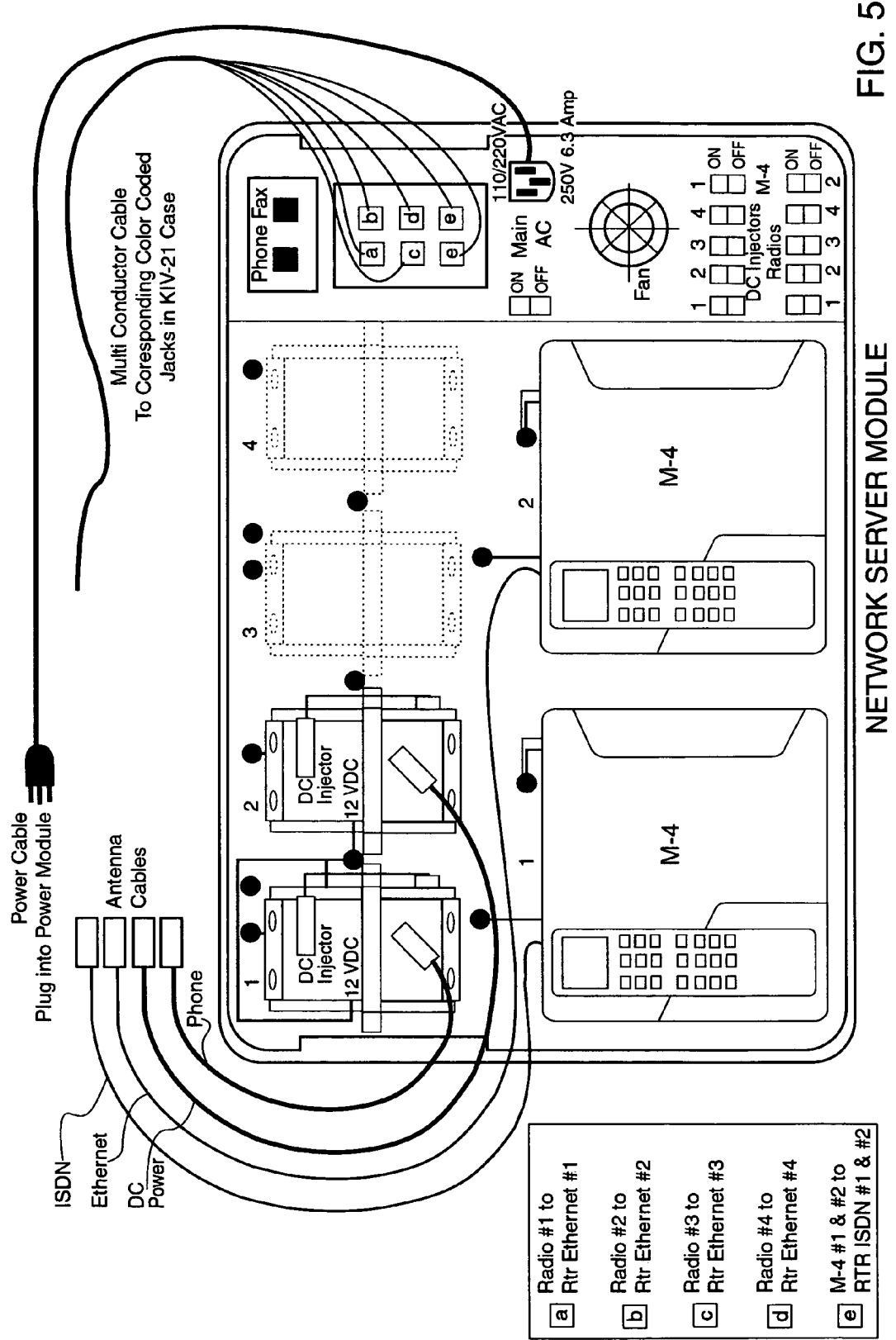
FIG. 5 shows an exemplary network WAN module, in accordance with the principles of the present invention.

FIG. 5 shows an exemplary network WAN module, in accordance with the principles of the present invention.

Figure 6:
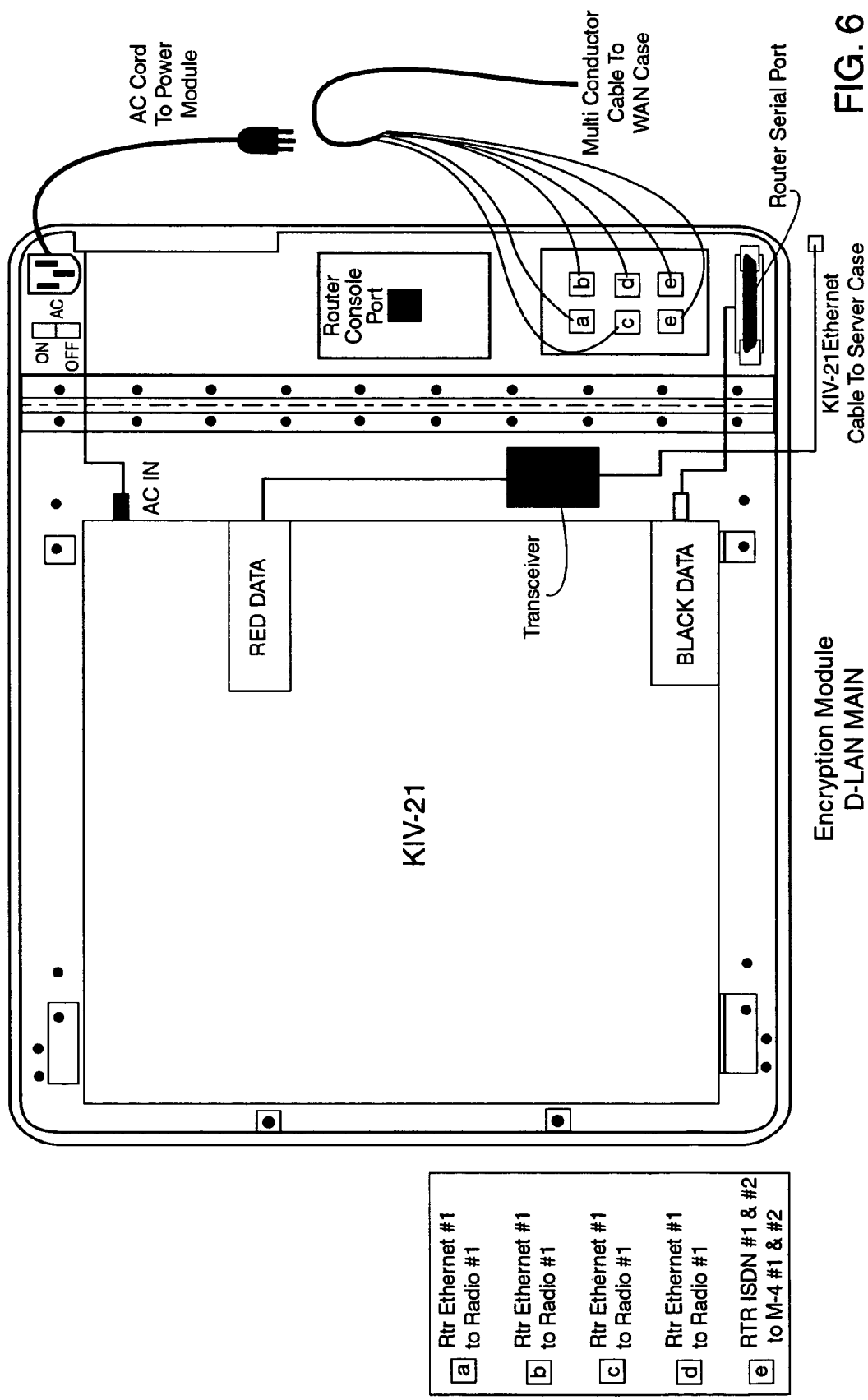
FIG. 6 shows an exemplary network encryption module, in accordance with the principles of the present invention.

FIG. 6 shows an exemplary network encryption module based on a KIV-21, in accordance with the principles of the present invention.

In particular, FIG. 6 shows a Network Encryption D-LAN MAIN module. The NEM provides NSA Type 1 encryption for network operations. With this module all traffic entering or leaving the network is fully encrypted up to a level of TS. As configured the module consists of a Cisco 3640 router with five (5) Ethernet ports and two (2) ISDN PRI ports, and the new KIV-21 IP encryption device manufactured by VIASAT. One advantage to using the KIV-21 as opposed to older devices is the ability to establish a point-to-multipoint, fully meshed network. Unlike legacy devices such as the KIV-7, KIV-19 and KG type units that could only establish a point-to-point connection with a matched device, each KIV-21 in the network can communicate directly with any other KIV-21 containing a compatible key. This allows significant improvement in communications while limiting the size and weight of the total deployable package. Although configured with the KIV-21 for this requirement, any existing encryption device can be integrated into the system as user requirements dictate. In addition, commercially available, non Type 1 devices/software can be integrated into the LPDCS for commercial/non US Government applications. The module is integrated into a custom roll-around case measuring 21" W×15" L×9" D and weighs about 55 lbs.

Figure 7:
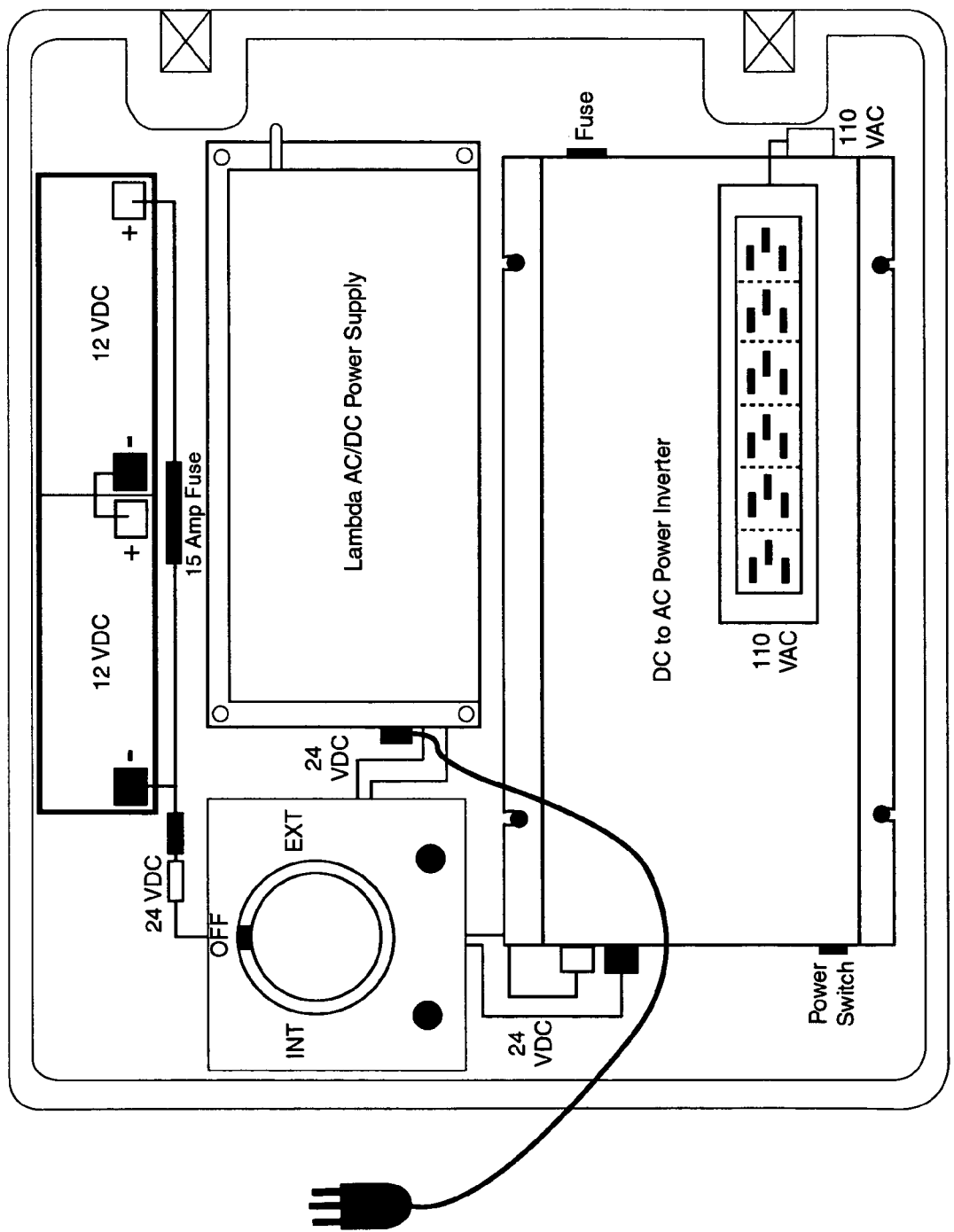
FIG. 7 shows a universal power module, in accordance with the principles of the present invention.

FIG. 7 shows a universal power module, in accordance with the principles of the present invention.

In particular, FIG. 7 shows a universal power module. It is preferred that each of the disclosed systems operate from universal AC power sources, have built-in battery backup supporting all system components for a minimum of 15 minutes, and also have the ability to be supplied with an external DC power source. To satisfy this requirement we evaluated numerous commercially available UPS systems, but found none that met size, weight and operational parameters. The UPSI 1000 and 1400 series UPS provided the universal AC input requirement, but did not allow for external DC input and exceeded the 70 lb weight restriction. Our next alternative was to evaluate designing a smaller AC source and UPS into each of the individual module cases, but again this proved to be ineffective because of weight and size issues. Our final solution was to design an independent power module capable of powering the entire system. UPM was assembled using commercial-off-the-shelf equipment and consists of one (1) universal front end, one (1) DC to AC power inverter, two (2) 12 volt batteries and a main power switch.

Figure 8:
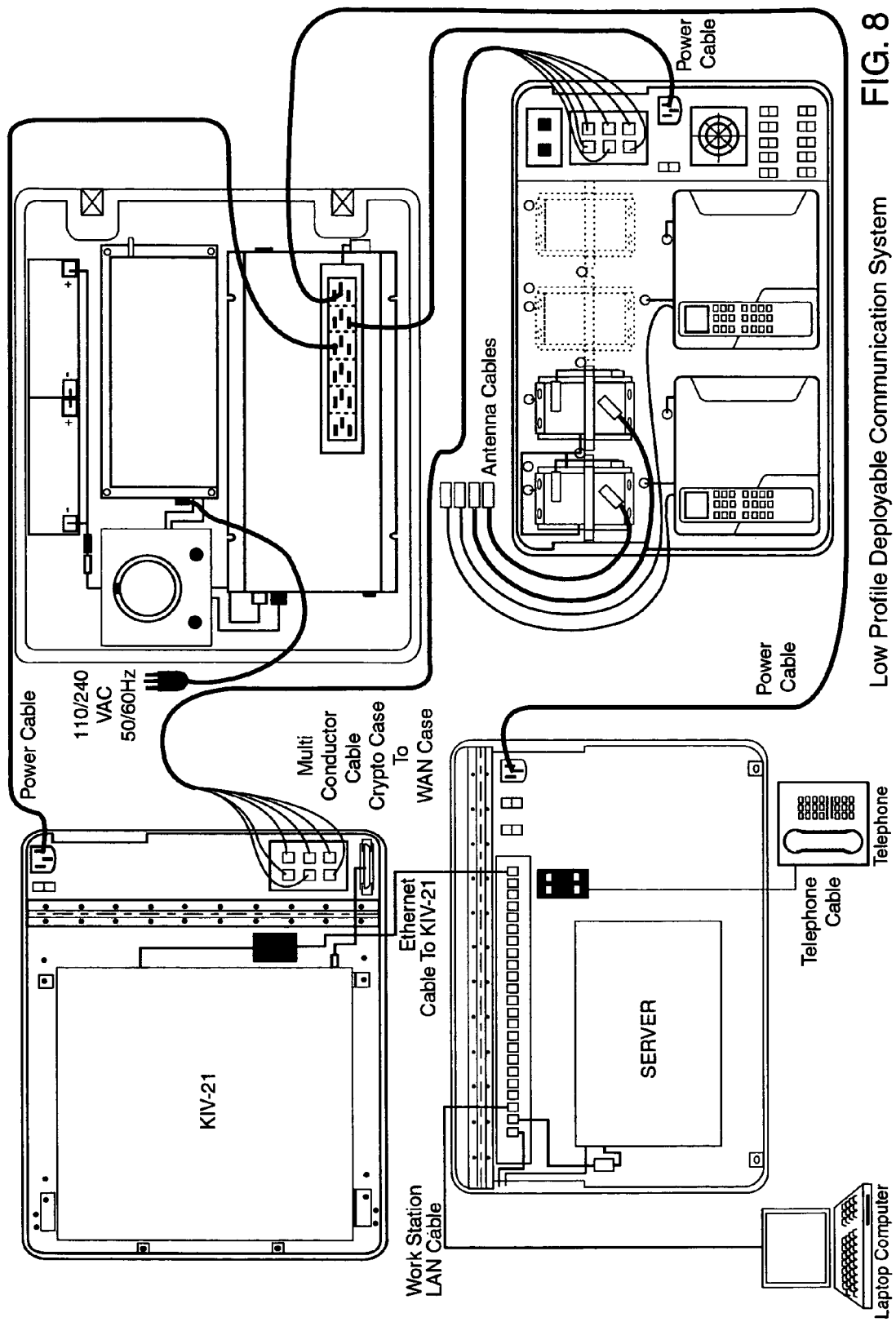
FIG. 8 shows a low profile deployable secure communication system integrating a network server module, a network WAN module, an encryption module, and a universal power module, in accordance with the principles of yet another aspect of the present invention.
Figure 9:
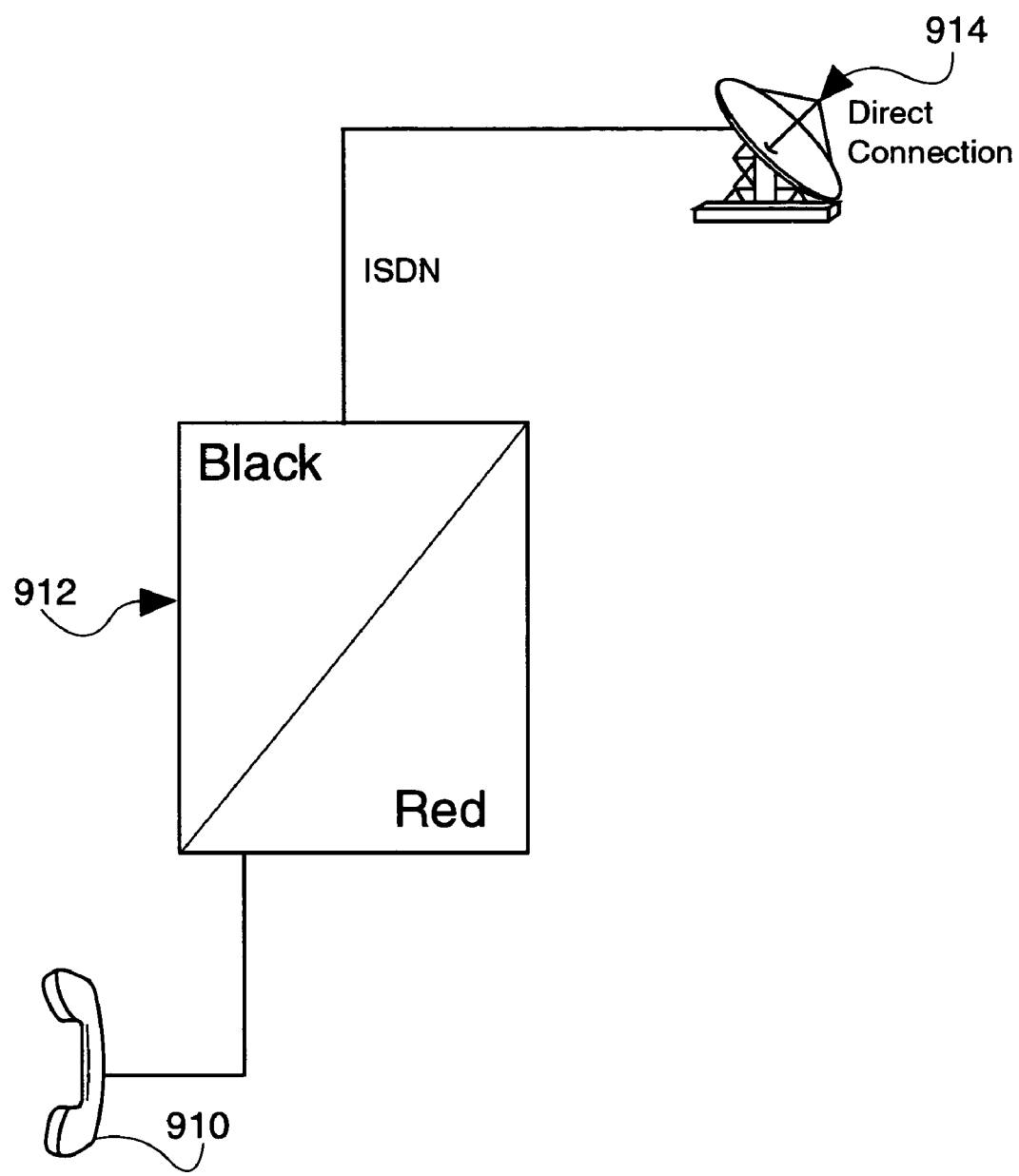
FIG. 9 is a depiction of a particular conventional deployable secure communication system.

FIG. 8 shows a low profile deployable secure communication system integrating a network server module, a network WAN module, an encryption module, and a universal power module, in accordance with the principles of yet another aspect of the present invention.

A universal front end accepts between 86-240 VAC and provides 24 volts DC to the on-board batteries and the DC/AC inverter. The inverter conditions the power and provides a stable 110 VAC output for the network components. In the event of commercial power loss, the on-board batteries are sufficient to support operations for the required minimum of 15 minutes and have been tested to operate in excess of 45 minutes. Operation of all system components in a hot standby mode has been demonstrated in excess of two hours. In the event the internal batteries are depleted prior to commercial power restoration, two external 12 volt car batteries can be jumper together and connected into the module for continued operation. This module is integrated into a custom roll-around case measuring 15" W×24" L×9" D and weighs about 72 lbs including batteries.

While the invention has been described with reference to the exemplary embodiments thereof, those skilled in the art will be able to make various modifications to the described embodiments of the invention without departing from the true spirit and scope of the invention.

What is claimed is:

1. A method of providing a portable, deployable communication system, comprising:
   routing network data by a red side router;
   providing routing information from said red side router in bulk encrypted data;
   encapsulating said bulk encrypted data in IP packets; and
   routing said IP encapsulated, bulk encrypted data, through a black side router distinct from said red side router, from an output port of said portable, deployable communication system over a public Internet;
   wherein said portable, deployable communication system enables routing of secure communications via said public Internet using said IP packets comprising said encapsulated bulk encrypted data.

2. The method of providing a portable, deployable communication system according to claim 1, wherein:
   said encryption device is a KIV-7 encryption device.

3. The method of providing a portable, deployable communication system according to claim 1, wherein:
   said encryption device is a KIV-21 encryption device.

4. Apparatus for providing a portable, deployable communication system, comprising:
   means for routing network data by a red side router;
   means for providing routing information from said red side router in bulk encrypted data;
   means for encapsulating said bulk encrypted data in IP packets; and
   means for routing said IP encapsulated, bulk encrypted data, through a black side router distinct from said red side router, from an output port of said portable, deployable communication system over a public Internet;
   wherein said portable, deployable communication system enables routing of secure communications via said public Internet using said IP packets comprising said encapsulated bulk encrypted data.

5. The apparatus for providing a portable, deployable communication system according to claim 4, wherein:
   said encryption device is a KIV-7 encryption device.

6. The apparatus for providing a portable, deployable communication system according to claim 4, wherein:
   said encryption device is a KIV-21 encryption device.

* * * * *

UNITED STATES PATENT AND TRADEMARK OFFICE
CERTIFICATE OF CORRECTION

PATENT NO. : 7,577,835 B2  Page 1 of 1
APPLICATION NO. : 10/643868
DATED : August 18, 2009
INVENTOR(S) : Anspach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 931 days.

Signed and Sealed this

Seventh Day of September, 2010

David J. Kappos
*Director of the United States Patent and Trademark Office*